US010465780B2

(12) United States Patent
Pyers et al.

(10) Patent No.: US 10,465,780 B2
(45) Date of Patent: Nov. 5, 2019

(54) ROTOR CARRIER ASSEMBLY

(71) Applicant: Schaeffler Technologies AG & Co. KG, Herzogenaurach (DE)

(72) Inventors: Gabe Pyers, Wooster, OH (US); Matthew Payne, Glenmont, OH (US); Markus Steinberger, Macedonia, OH (US); Allen McAfoos, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 15/683,406

(22) Filed: Aug. 22, 2017

(65) Prior Publication Data
US 2018/0058559 A1 Mar. 1, 2018

Related U.S. Application Data

(60) Provisional application No. 62/378,533, filed on Aug. 23, 2016.

(51) Int. Cl.
| *F16H 41/24* | (2006.01) |
| *H02K 11/225* | (2016.01) |
| *H02K 1/02* | (2006.01) |
| *H02K 1/22* | (2006.01) |
| *H02K 1/28* | (2006.01) |
| *H02K 7/00* | (2006.01) |
| *H02K 7/108* | (2006.01) |
| *H02K 1/27* | (2006.01) |
| *B60K 6/26* | (2007.10) |
| *B60K 6/442* | (2007.10) |

(Continued)

(52) U.S. Cl.
CPC ............ *F16H 41/24* (2013.01); *H02K 1/02* (2013.01); *H02K 1/223* (2013.01); *H02K 1/278* (2013.01); *H02K 1/28* (2013.01); *H02K 7/006* (2013.01); *H02K 7/108* (2013.01); *H02K 11/225* (2016.01); *B60K 6/26* (2013.01); *B60K 6/442* (2013.01); *F16D 48/064* (2013.01); *F16H 45/02* (2013.01)

(58) Field of Classification Search
CPC ........ H02K 11/225; H02K 1/02; H02K 1/223; H02K 1/28; F16H 41/28; F16H 41/24
USPC .............................. 60/330; 192/3.21; 701/22
See application file for complete search history.

(56) References Cited

U.S. PATENT DOCUMENTS 6,092,985 A 7/2000 Winkam
8,838,366 B2 * 9/2014 Suyama ................ B60K 6/387
701/105

(Continued)

FOREIGN PATENT DOCUMENTS

WO 2011074662 A1 6/2011

*Primary Examiner* — F Daniel Lopez
*Assistant Examiner* — Richard C Drake
(74) *Attorney, Agent, or Firm* — Kevin L. Parks

(57) ABSTRACT

A rotor assembly includes a torque converter having a housing forming a hydraulic chamber, a rotor for an electric motor, a rotor carrier non-rotatably connected to the rotor, wherein the rotor carrier is fixed to the torque converter housing, and a seal is disposed between the torque converter housing and rotor carrier for sealing therebetween. In some example embodiments, the rotor assembly has at least one bolt for fixing the torque converter housing to the rotor carrier. In some embodiments, the rotor carrier includes an aperture and the at least one bolt is disposed in the aperture.

20 Claims, 3 Drawing Sheets

(51) Int. Cl.
*F16D 48/06* (2006.01)
*F16H 45/02* (2006.01)

(56) References Cited

U.S. PATENT DOCUMENTS

| | | | |
|---|---|---|---|
| 8,960,393 B2* | 2/2015 | Frait | B60K 6/387 |
| | | | 192/3.21 |
| 9,140,311 B2* | 9/2015 | Iwase | F16D 25/0638 |
| 2004/0045752 A1 | 3/2004 | Omote et al. | |
| 2006/0289209 A1 | 12/2006 | Grosspietsch et al. | |
| 2008/0174200 A1* | 7/2008 | Okamoto | H02K 15/02 |
| | | | 310/216.018 |
| 2010/0062899 A1* | 3/2010 | Engelmann | F16D 25/0638 |
| | | | 477/86 |
| 2011/0240431 A1* | 10/2011 | Iwase | B60K 6/26 |
| | | | 192/3.29 |
| 2013/0192947 A1 | 8/2013 | Frait et al. | |
| 2014/0103772 A1* | 4/2014 | Kingrey | H02K 15/03 |
| | | | 310/156.15 |
| 2014/0144742 A1* | 5/2014 | Sperrfechter | B60K 6/26 |
| | | | 192/3.29 |
| 2016/0105060 A1* | 4/2016 | Lindemann | H02K 7/006 |
| | | | 701/22 |
| 2016/0109010 A1* | 4/2016 | Lindemann | B23P 15/00 |
| | | | 192/3.21 |

\* cited by examiner

ROTOR CARRIER ASSEMBLY

TECHNICAL FIELD

The present disclosure relates generally to a hybrid module, and more specifically to a rotor carrier assembly.

BACKGROUND

Rotor assemblies are known. One example is shown and described in commonly-assigned United States Patent Publication No. 2016/0105060, hereby incorporated by reference as if set forth fully herein.

BRIEF SUMMARY

Example aspects broadly comprise a rotor assembly including a torque converter having a housing forming a hydraulic chamber, a rotor for an electric motor, a rotor carrier non-rotatably connected to the rotor, wherein the rotor carrier is fixed to the torque converter housing. The rotor assembly also includes a seal disposed between the rotor carrier and the torque converter housing for sealing the torque converter housing to the rotor carrier. In some embodiments, at least one bolt is provided for fixing the torque converter housing to the rotor carrier. The rotor carrier may include a first aperture formed in an end of the rotor carrier facing the torque converter housing, and the torque converter may include a second aperture. The first aperture is axially aligned with the second aperture, and the at least one bolt is disposed within the first and second apertures to fix the torque converter housing to the rotor carrier.

In an example embodiment, the seal is a compressible gasket. In an example embodiment, the rotor assembly includes a hardened plate with an aperture and the at least one bolt is disposed in the aperture. The hardened plate is disposed between a head of the bolt and the torque converter housing. In some example embodiments, the rotor carrier is formed from a non-magnetic material or a non-ferrous metal. In other embodiments, the rotor carrier is formed from gold, aluminum, beryllium, lead, magnesium, nickel, platinum, zinc, copper or stainless steel.

In another embodiment, a rotor assembly includes a torque converter having a torque converter housing, an impeller having a plurality of impeller blades fixed to the torque converter housing, a turbine, and a stator. The rotor assembly further includes a rotor for an electric motor and a rotor carrier having an outer diameter. The rotor is non-rotatably connected to the rotor carrier outer diameter, and the rotor carrier is connected to the torque converter housing by a bolt disposed within a first aperture formed in an axial end of the rotor carrier. In some embodiments the torque converter housing includes a second aperture axially aligned with the first aperture of the rotor carrier such that when the rotor carrier is connected to the torque converter housing, the bolt is disposed within both the first and second apertures.

In an example embodiment, the rotor assembly has at least one clutch plate drivingly engaged with the rotor carrier. In an example embodiment, at least a portion of the rotor is axially aligned with a stator for the electric motor. Rotor assembly includes a torque converter with the torque converter housing, a plurality of impeller blades fixed to the torque converter housing, and a turbine assembly, stator assembly, and damper assembly disposed within the torque converter housing.

BRIEF DESCRIPTION OF THE DRAWINGS

The nature and mode of operation of the present disclosure will now be more fully described in the following detailed description taken with the accompanying drawing figures, in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In general, it is important that the rotor of an electric motor does not move relative to its position at the time of calibration to prevent degradation of performance and to prevent excessive imbalance. Embodiments disclosed herein provide a two-piece design that uses a rotor carrier fixed to a torque converter cover by bolts sealed to the cover. The disclosed embodiments provide several advantages that include maintaining the position of the rotor within a hybrid module, thereby improving performance characteristics and preventing imbalance that results from undesirable rotor movement.

Figure 1:
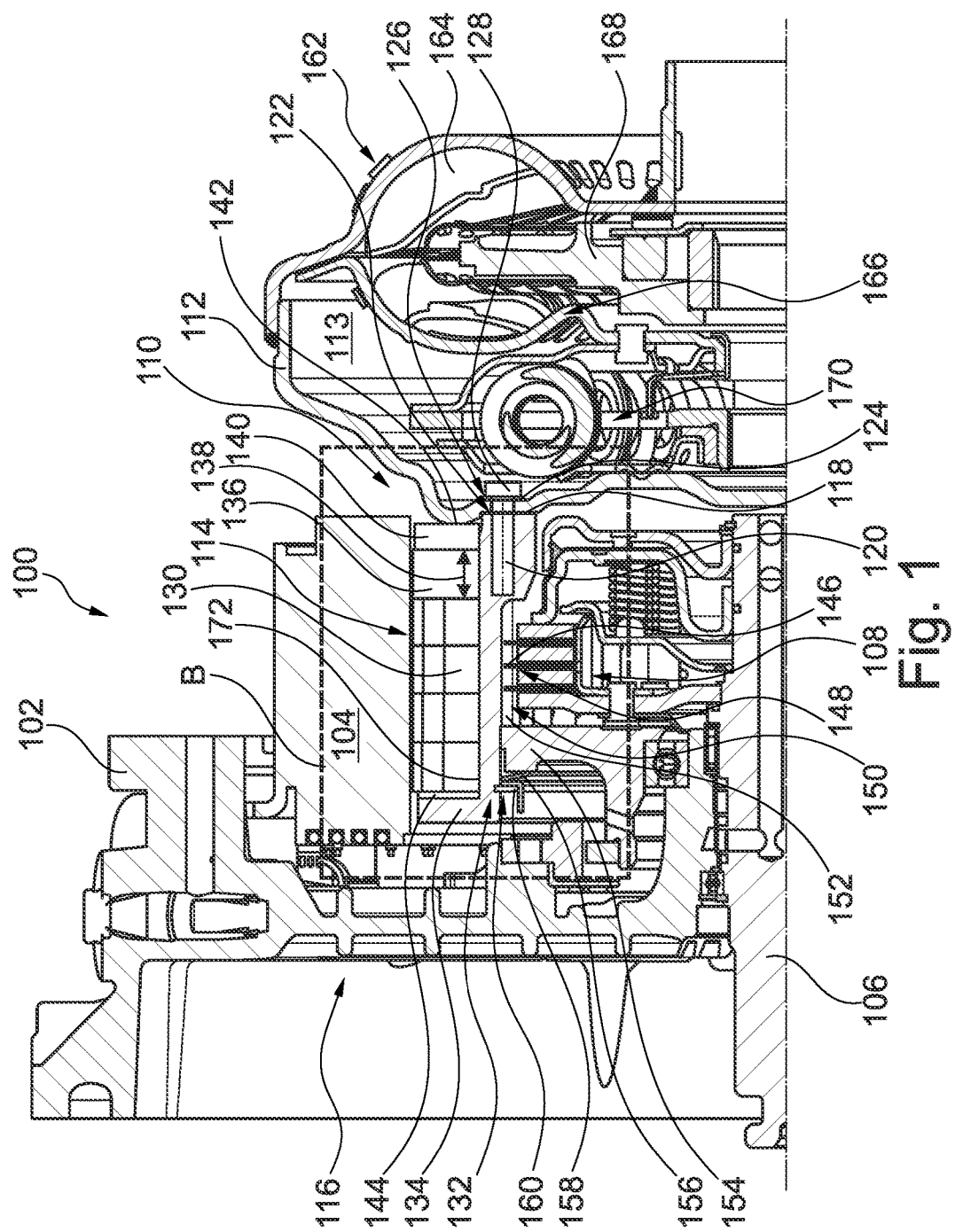
FIG. 1 is a partial cross-sectional view of a hybrid module according to an example aspect.
Figure 2:
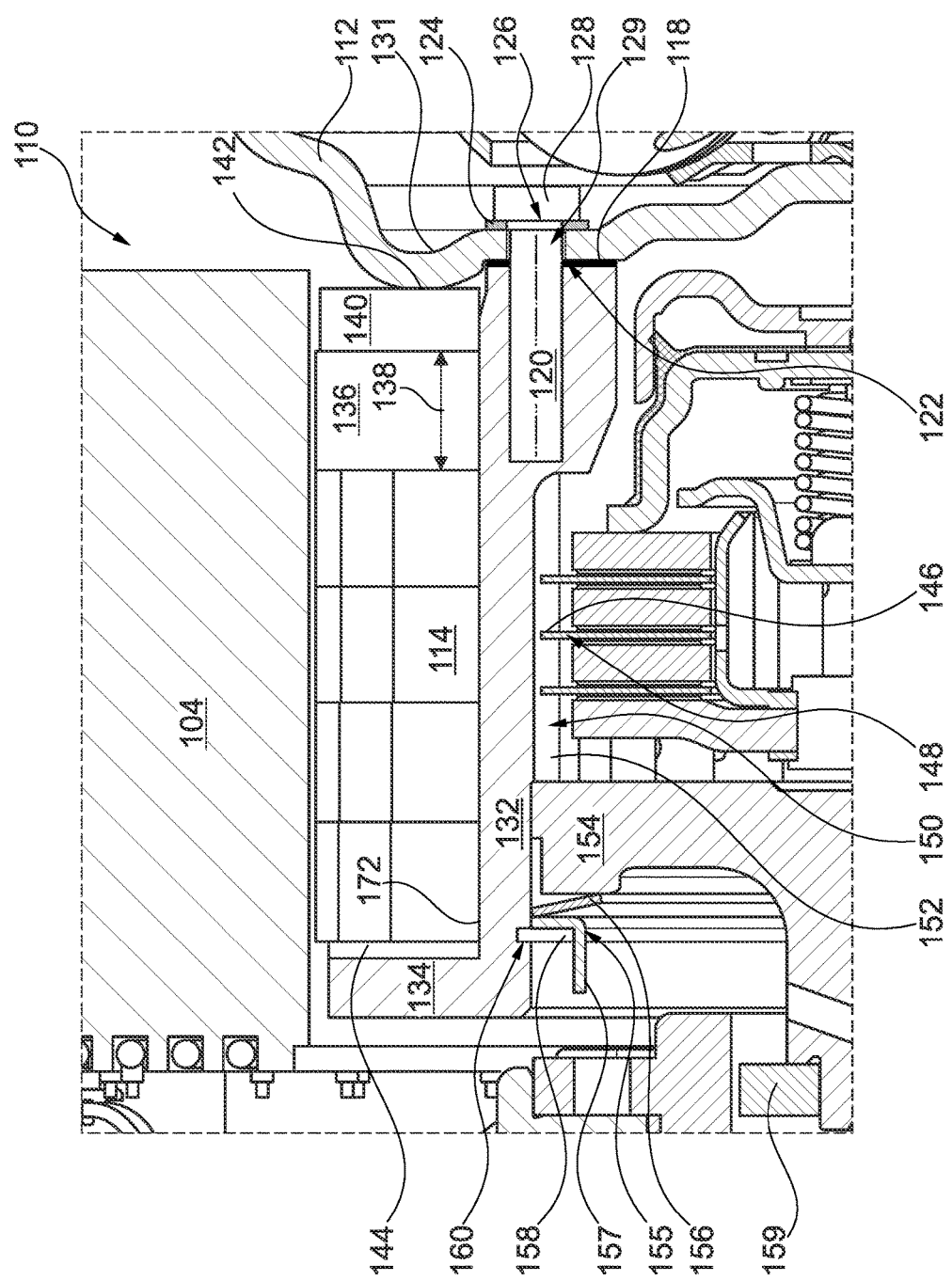
FIG. 2 is a detailed view of Area B of the hybrid module shown in FIG. 1.

The following description is made with reference to FIGS. 1-2. FIG. 1 is a partial cross-sectional view of a hybrid module 100 according to an example aspect. FIG. 2 is a detailed view of Area B of the hybrid module 100 shown in FIG. 1. Hybrid module 100 includes housing 102 with stator 104, electric motor 116, shaft 106, and rotor assembly 110. Rotor assembly 110 includes rotor 114 axially aligned with stator 104 of electric motor 116, rotor carrier 132, clutch assembly 108, and a launch device such as torque converter 162. Torque converter 162 includes a torque converter housing 112 forming a hydraulic chamber 113, impeller blades 164 fixed to the torque converter housing 112, turbine assembly 166, stator assembly 168, and damper assembly 170.

Rotor 114, for electric motor 116, is non-rotatably connected to an outer diameter 172 of rotor carrier 132 and includes at least one rotor segment 130. Although rotor 114 is shown to include a plurality of rotor segments, one of ordinary skill in the art would understand that rotor 114 may include a single large rotor segment in other embodiments depending on the application and individual system constraints. Rotor carrier 132 includes annular ring 134 extending from rotor carrier 132 outer diameter 172. Annular ring 134 may be integrally formed with rotor carrier 132. By integral, it is meant that the rotor carrier 132 and the annular ring 134 are formed from a single piece of material. Other embodiments (not shown) may include a rotor carrier with a separate annular ring axially retained on the rotor carrier by a snap ring, for example. Rotor carrier 132 may be formed from cast steel, for example. Rotor 114 is axially clamped between the torque converter housing 112 and the rotor carrier 132 annular ring 134 to prevent movement of the rotor 114 for improved performance and reduced imbalance.

Rotor carrier 132 is fixed to torque converter housing 112 by bolt 120. Thus, a fixed connection is established between the rotor carrier 132 and torque converter housing 112. Torque is then transmitted from electric motor 116 and a combustion engine (not shown) through clutch assembly 108 to torque converter housing 112 via this fixed connection. Although only a single bolt 120 is shown, a plurality of bolts disposed about a circumference may be used to fix rotor carrier 132 to torque converter housing 112. Seal 118 is disposed between the torque converter housing 112 and the rotor carrier 132 for sealing the torque converter housing 112 to the rotor carrier 132. Seal 118 may be a compressible gasket, for example. Seal 118 is configured to seal around an aperture 122 formed in an axial end of rotor carrier 132. Torque converter housing 112 includes an aperture 129 formed therein that is aligned axially with the aperture 122 formed in the end of the rotor carrier 132. Rotor assembly 110 includes hardened plate 124. Hardened plate 124 is positioned on an inner surface 131 of torque converter housing 112 and includes aperture 126 axially aligned with aperture 122 of rotor carrier 132 and aperture 129 of torque converter housing 112. Bolt 120 is configured to be threaded through the aperture 126 of hardened plate 124, aperture 129 of torque converter housing 112, and then through aperture 122 of rotor carrier 132 for fixing torque converter housing 112 to rotor carrier 132 to prevent movement of rotor 114. In this manner, hardened plate 124 is disposed axially between head 128 of bolt 120 and an inner surface 131 of the torque converter housing 112.

Rotor assembly 110 further includes non-magnetic annular ring 144, annular ring 136, and non-magnetic annular ring 140 positioned on, or extending from, the outer diameter 172 of rotor carrier 132. Non-magnetic annular ring 144 is disposed axially between rotor 114 and rotor carrier 132 annular ring 134. Non-magnetic annular ring 144 is configured to prevent short circuit of the magnets in rotor 114. Annular ring 136 and non-magnetic annular ring 140 are disposed axially between rotor 114 and torque converter housing 112. Annular ring 136 has a thickness 138 that is selected to ensure that rotor 114 is clamped securely between the torque converter housing 112 and the rotor carrier 132 annular ring 134. That is, the thickness 138 is selected such that, when the bolt 120 is tightened, a force from the bolt 120 ensures a friction fit such that the rotor 114 does not rotate relative to the rotor carrier 132 or the torque converter housing 112. In some embodiments (not shown), annular rings 136 and 140 may be combined into a single non-magnetic annular ring with a thickness selected to ensure that the rotor 114 is clamped securely between rotor carrier 132 annular ring 134 and torque converter housing 112. Torque converter housing 112 includes machined support surface 142 and non-magnetic annular ring 140 contacts the machined support surface 142. Annular rings 144, 136, 140 and rotor 114 are slip fit to the rotor carrier 132 outer diameter 172.

With continual reference to FIG. 1, clutch assembly 108 includes clutch plate 148 drivingly engaged with rotor carrier 132. For example, the clutch plate 148 and rotor carrier 132 include complementary splines 146 and 150, respectively, in driving engagement. The rotor carrier spline 150 includes castellated portion 152. Rotor assembly 110 also includes rotor carrier flange 154, spring 156, snap ring 158, and retention element 155. Spring 156 may be a diaphragm spring, for example. The spring 156 is disposed axially between the snap ring 158 and the rotor carrier flange 154. Rotor carrier 132 includes groove 160 and the snap ring 158 is disposed in the groove 160. The spring 156 clamps the rotor carrier flange 154 between the snap ring 158 and the castellated portion 152. Retention element 155 is disposed between the spring 156 and the snap ring 158. Retention element 155 may be a shim having at least one tab 157 bent toward the snap ring 158 such that the at least one tab 157 contacts at least a portion of the snap ring 158 to secure the snap ring 158 in the groove 160. Rotor carrier 132 is arranged to non-rotatably engage rotor resolver 159.

Figure 3:
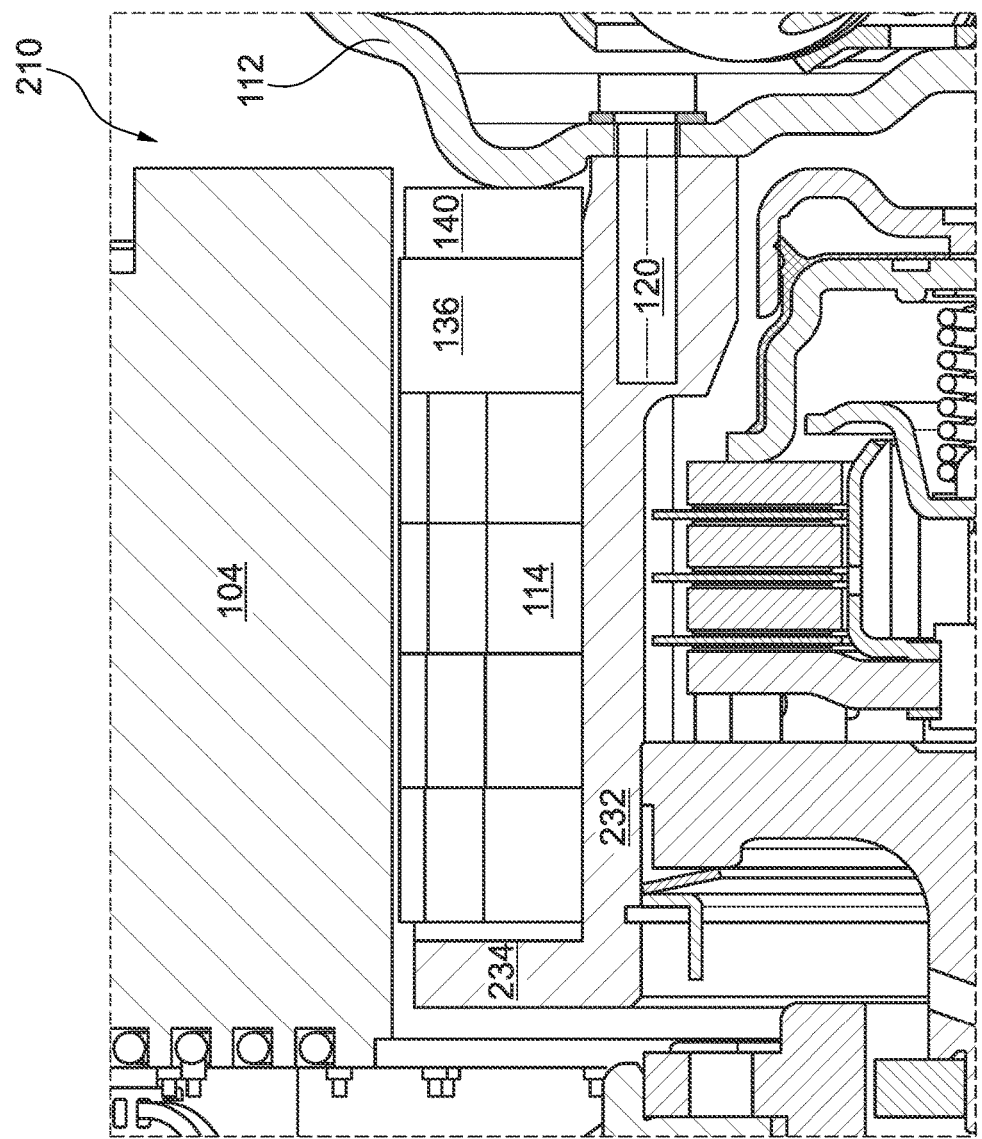
FIG. 3 is a detailed view of an alternative embodiment of Area B of the hybrid module shown in FIG. 1.

The following description is made with reference to FIG. 3. FIG. 3 is a detailed view of an alternative embodiment of Area B of hybrid module 100 shown in FIG. 1. Rotor assembly 210 is similar to rotor assembly 110 and 2XX labels generally correspond to 1XX labels except as described below. Rotor carrier 232 is formed from a non-magnetic or non-ferrous material. For example, rotor carrier 232 may be formed of gold, aluminum, beryllium, lead, magnesium, nickel, platinum, zinc, copper and/or stainless steel. The use of a non-magnetic material for rotor carrier 232 obviates the need for non-magnetic ring 144 shown in rotor assembly 110 of FIGS. 1 and 2. Rotor carrier 232 further includes integral annular ring 234.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE CHARACTERS

100 Hybrid Module
102 Housing
104 Stator

106 Shaft
108 Clutch Assembly
110 Rotor Assembly
112 Torque Converter Housing
113 Hydraulic Chamber
114 Rotor
116 Electric Motor
118 Seal
120 Bolt
122 Aperture
124 Hardened Plate
126 Aperture
129 Aperture
128 Head of Bolt
130 Rotor Segment
131 Inner Surface
132 Rotor Carrier
134 Annular Ring
136 Annular Ring
138 Thickness
140 Non-Magnetic Annular Ring
142 Machined Support Surface
144 Non-Magnetic Annular Ring
146 Spline
148 Clutch Plate
150 Spline
152 Castellated Portion
154 Rotor Carrier Flange
155 Retention Element
156 Spring
157 Tab
158 Snap Ring
159 Resolver
160 Groove
162 Torque Converter
164 Impeller Blades
166 Turbine Assembly
168 Stator Assembly
170 Damper Assembly
172 Outer Diameter
210 Rotor Assembly
232 Rotor Carrier
234 Integral Annular Ring

What we claim is:

1. A rotor assembly, comprising:
a torque converter including a housing forming a hydraulic chamber;
a rotor for an electric motor;
a rotor carrier non-rotatably connected to the rotor, wherein the rotor carrier is fixed to the torque converter housing by a fastener extending from the hydraulic chamber through the housing and into the rotor carrier; and,
a seal surrounding the fastener and disposed between the rotor carrier and the torque converter housing for sealing the torque converter housing to the rotor carrier.

2. The rotor assembly of claim 1, wherein the fastener is at least one bolt for fixing the torque converter housing to the rotor carrier.

3. The rotor assembly of claim 2 wherein:
the rotor carrier includes a first aperture formed in an end of the rotor carrier facing the torque converter housing and extending only partially through the rotor carrier; and,
the torque converter includes a second aperture, the first aperture being axially aligned with the second aperture, wherein the at least one bolt is disposed within the first and second apertures to fix the torque converter housing to the rotor carrier.

4. The rotor assembly of claim 1 wherein the seal is a compressible gasket.

5. The rotor assembly of claim 3, further comprising a hardened plate wherein:
the hardened plate includes a third aperture axially aligned with the first and second apertures and arranged such that the at least one bolt is disposed in the third aperture; and,
the hardened plate is disposed between a head of the bolt and an inner surface of the torque converter housing.

6. The rotor assembly of claim 1, wherein:
the rotor carrier includes an integral annular ring; and,
the rotor is axially clamped between the torque converter housing and the rotor carrier integral annular ring.

7. The rotor assembly of claim 6, further comprising an annular ring disposed between the rotor and the torque converter housing, wherein the annular ring includes a thickness selected to ensure the rotor is clamped between the torque converter housing and the rotor carrier integral annular ring.

8. The rotor assembly of claim 7, further comprising a first non-magnetic annular ring disposed between the rotor and the torque converter housing.

9. The rotor assembly of claim 8 further comprising a second non-magnetic annular ring disposed between the rotor and the rotor carrier integral annular ring.

10. The rotor assembly of claim 9 wherein the rotor carrier is formed from one of a non-magnetic material and non-ferrous metal.

11. The rotor assembly of claim 9 wherein the rotor carrier is formed from a material selected from the group consisting of gold, aluminum, beryllium, lead, magnesium, nickel, platinum, zinc, copper, and stainless steel.

12. The rotor assembly of claim 8 wherein the rotor carrier is formed from cast steel.

13. A rotor assembly, comprising:
a torque converter including:
a torque converter housing;
an impeller having a plurality of impeller blades fixed to the torque converter housing;
a turbine; and,
a stator;
a rotor for an electric motor; and,
a rotor carrier having an outer diameter, wherein the rotor is non-rotatably connected to the rotor carrier outer diameter, the rotor carrier is connected to the torque converter housing by a bolt disposed within a first aperture formed in an axial end of the rotor carrier and extending only partially through the rotor carrier, and the rotor carrier is sealed to the torque converter housing by a compressible gasket surrounding the bolt.

14. The rotor carrier of claim 13 wherein the torque converter housing includes a second aperture axially aligned with the first aperture of the rotor carrier and extending completely through the torque converter housing such that when the rotor carrier is connected to the torque converter housing, the bolt is disposed within both the first and second apertures.

15. The rotor carrier of claim 14 further comprising a hardened plate disposed axially between an inner surface of the torque converter housing and a head of the bolt.

16. The rotor assembly of claim 13, wherein:
the rotor carrier includes an annular ring extending from the rotor carrier outer diameter; and, the rotor is axially clamped between the rotor carrier annular ring and the torque converter housing.

17. The rotor assembly of claim 16 further comprising:
a first non-magnetic annular ring disposed between the rotor and the rotor carrier annular ring; and,
a second non-magnetic annular ring disposed between the rotor and torque converter housing, wherein the second non-magnetic annular ring has a thickness selected to ensure a friction fit such that the rotor does not rotate relative to the rotor carrier or the torque converter housing.

18. The rotor assembly of claim 13, further comprising a clutch assembly including at least one clutch plate drivingly engaged with the rotor carrier.

19. The rotor assembly of claim 13 wherein at least a portion of the rotor is axially aligned with a stator for the electric motor.

20. A rotor assembly, comprising:
a torque converter including a housing forming a hydraulic chamber;
a rotor for an electric motor;
a rotor carrier non-rotatably connected to the rotor, wherein the rotor carrier is fixed to the torque converter housing;
a seal disposed between the rotor carrier and the torque converter housing for sealing the torque converter housing to the rotor carrier;
an annular ring disposed between the rotor and the torque converter housing; and,
a first non-magnetic annular ring disposed between the rotor and the torque converter housing, wherein:
the rotor carrier includes an integral annular ring;
the rotor is axially clamped between the torque converter housing and the rotor carrier integral annular ring;
the annular ring includes a thickness selected to ensure the rotor is clamped between the torque converter housing and the rotor carrier integral annular ring; and,
the torque converter housing includes a machined support surface and the first non-magnetic annular ring contacts the machined support surface.

* * * * *